No. 735,869. PATENTED AUG. 11, 1903.
J. G. GARDNER.
METHOD OF COLLECTING GUMS FROM TREES.
APPLICATION FILED FEB. 17, 1903.
NO MODEL
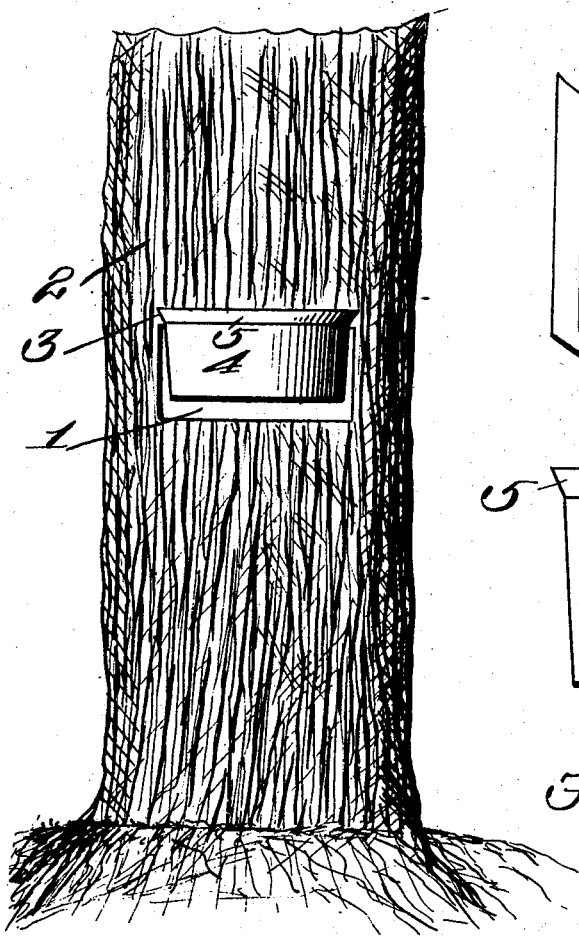
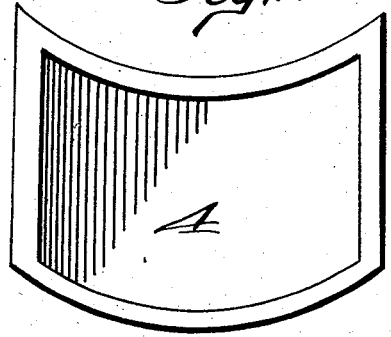
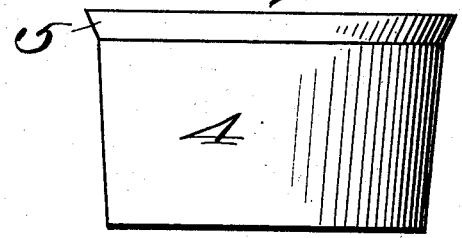
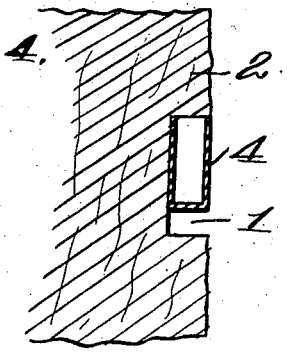
Witnesses:
C. T. Kesler
W. B. Kelly
Inventor
Joshua G. Gardner
By
James L. Norris
Atty.

No. 735,869. Patented August 11, 1903.

UNITED STATES PATENT OFFICE.

JOSHUA G. GARDNER, OF SAVANNAH, GEORGIA.

METHOD OF COLLECTING GUMS FROM TREES.

SPECIFICATION forming part of Letters Patent No. 735,869, dated August 11, 1903.

Application filed February 17, 1903. Serial No. 143,866. (No model.)

*To all whom it may concern:*

Be it known that I, JOSHUA G. GARDNER, a citizen of the United States, residing at Savannah, in the county of Chatham and State of Georgia, have invented new and useful Improvements in Methods of Collecting Gums from Trees, of which the following is a specification.

This invention relates to a certain new and useful method of collecting gums from pine-trees for obtaining rosin and turpentine, and aims particularly to prevent the evaporation, oxidation, and drying of the gum during its collection, as well as preventing impurities from admixing with the gum.

The method is also adapted to increase the life of the trees, the natural life of which is shortened by the methods usually employed for collecting the gum, owing to the fact that with known methods the natural life of the tree is shortened by the constant hacking and chipping thereof to form a fresh wound to obtain the gum, whereas in the method to be hereinafter set forth this constant hacking or chipping is prevented.

The methods now generally employed for obtaining gums from pine-trees practically have destroyed half of the turpentine-yielding trees of the South, owing to the fact that cuts are made in the tree approximately one-third of its diameter to form a wound, and this cut-away portion is continually enlarged to form a fresh wound during the sap-flowing season. Generally this formation of a fresh wound is done weekly. This weekly hacking or chipping cuts away an average of one inch and in five years destroys the life of the tree. The ordinary life of the tree is from forty to fifty years, and the present methods in vogue generally destroy the tree in five years, owing to the constant chipping or hacking to obtain a fresh wound, whereas according to the method hereinafter set forth it would take about forty-eight years to chip off six feet upward from the first wound along the outside of the trunk, owing to the fact that it is not necessary to open a wound in such a frequent manner, for the reason that the gum-collecting crate is adapted to fit in the cut-away portion of the tree and up against the wound, and thereby excluding air and light, consequently preventing the drying of the wound and the oxidation of the gum, also the evaporation of turpentine from the gum, the results obtained by this new and novel procedure being, first, not injuring the life of the tree, and, second, the obtaining of virgin rosin.

To more fully set forth the method, reference is had to the accompanying drawings, in which—

Figure 1 shows an elevation of the trunk of a tree broken away at its top and further showing the collecting-crate in position. Fig. 2 is a plan view of the collecting-crate. Fig. 3 is a front elevation of the collecting-crate; and Fig. 4 is a sectional elevation of a portion of a tree, showing the arrangement of the gum-collecting crate within the incision and against the wound.

The method of collecting the gum according to this invention is carried out as follows: An incision 1 is made into the trunk of a tree 2, so as to form supporting-shoulders 3. This incision 1 is formed by any suitable means, and at the same time that the incision is made the wound is cut. After the incision 1 and wound have been made the gum-collecting crate 4, having an open top and closed sides and bottom, is placed in position. The inner wall of the crate 4 is of such contour as to fit snugly against the rear wall of the incision, and the front wall of the crate 4 is substantially segmental in form, so as to conform to the contour of the tree. Preferably the front and inner walls of the crate are segmental in contour, as the rear wall of the incision is preferably segmental in contour. The crate 4 is substantially as wide as the depth of the incision and is formed at its top with a flange 5, adapted when the crate 4 is in position to rest against the shoulders 3. The latter then support the crate. When the crate is in position, the top edge of the sides, front, and inner walls thereof fits snugly against the wound, and the crate does not extend beyond the periphery of the trunk of the tree, or, in other words, when the crate 4 is in position the inner wall thereof lies against the rear wall of the incision and the periphery of the front wall is flush with the periphery of the trunk of the tree. By this arrangement of the crate the wound is prevented from rapidly drying, owing to the fact that light and air are excluded, as the open top of the crate is against the wound. Furthermore, the gum is prevented from being oxidized or evaporated, and, furthermore, impurities are prevented from admixing with it. When it is necessary to form a new wound in the tree, the trunk is cut away one-eighth of an inch above the wound in such a manner as to form shoulders similar to the shoulders 3, and the first-mentioned shoulders are cut off simultaneously with the formation of the new shoulders. The crate is then moved upwardly one-eighth of an inch and supported by new shoulders, which are of the same contour as the shoulders 3. It will be evident that owing to the fact that but one-eighth of an inch is cut away to form the new wound it would take about forty-eight years to cut away six feet of the trunk. It will also be evident that this slight cutting away will increase the life of the tree over that of the methods now generally employed, for the reason that the trunk is cut away in such a manner in the method now in vogue that the life of the tree is only five years. This cutting away of the trunk, which is necessary in the method now employed, is about one inch, and it is evident that the small cutting away of the trunk, as set forth by this new and novel method, will materially increase the life of the tree over that of the cutting away of an inch of the trunk, as is done in the known methods. It may not be necessary to open the wound of the tree by cutting in the manner as set forth, for the reason that the crate 4 excludes the air and prevents the wound from drying up; but if it be necessary a cut of one-eighth of an inch is all that is required. It will also be evident that as the crate does not project or extend away from the periphery of the trunk of the tree it cannot be interfered with by cattle, which is an objection to the projecting crates now in general use, and it will furthermore be evident that owing to the fact that the crate fits in the trunk of the tree in such a manner as to prevent entrance of impurities and the drying, evaporating, and oxidizing of the gum the gum collected in the crate will always yield virgin rosin.

It is thought the many advantages of my improved method for collecting gums from trees, particularly in the preventing of the oxidizing and evaporating of the gum, the drying of the wound, and the mixing of impurities with the gum as it is being collected, will be readily understood from the foregoing description, taken in connection with the accompanying drawings, and it will furthermore be evident that changes, variations, and modifications can be resorted to without departing from the spirit of the invention or sacrificing any of its advantages, and I do not, therefore, wish to restrict myself to the specific details as hereinbefore described and as shown in the accompanying drawings, but reserve the right to make such changes, variations, and modifications as come properly within the scope of the protection prayed.

Having thus fully described my invention, what I claim as new, and desire to secure by Letters Patent, is—

1. A method of collecting gum from trees which consists in cutting an incision in the trunk of a tree, and then arranging a gum-collecting receptacle in the said incision in close proximity to the wound to prevent the drying thereof, the oxidation of the gum and the collection of external impurities.

2. A method of collecting gum from trees, which consists in cutting an incision in the trunk of a tree to form the wound, and then placing a gum-collecting receptacle in the incision so as to collect the gum and to prevent the evaporation of the gum during its collection.

In testimony whereof I have hereunto set my hand in presence of two subscribing witnesses.

JOSHUA G. GARDNER.

Witnesses:
F. B. KEEFER,
GEO. W. REA.